United States Patent [19]

Machart et al.

[11] Patent Number: 4,757,549

[45] Date of Patent: Jul. 12, 1988

[54] FREEHAND DRAWING CONTAINING INVISIBLE LINES

[75] Inventors: Beverly H. Machart; John S. Wang, both of Austin, Tex.

[73] Assignee: International Business Machines Corp., Armonk, N.Y.

[21] Appl. No.: 808,263

[22] Filed: Dec. 12, 1985

[51] Int. Cl.$^4$ .............................................. G06K 9/00
[52] U.S. Cl. .......................................... 382/3; 382/2; 382/13; 382/59; 178/18; 340/706
[58] Field of Search ................... 178/18, 19; 382/2, 3, 382/9, 13, 21, 24, 59; 364/200, 900; 340/706, 709

[56] References Cited

U.S. PATENT DOCUMENTS

| | | | |
|---|---|---|---|
| 4,365,235 | 12/1982 | Greanias et al. | 382/24 |
| 4,455,451 | 6/1984 | Kriz | 178/19 |
| 4,495,644 | 1/1985 | Parks et al. | 382/13 |
| 4,495,646 | 1/1985 | Gharachorloo | 382/59 |
| 4,603,231 | 7/1986 | Reiffel et al. | 178/19 |
| 4,628,479 | 12/1986 | Borg et al. | 364/900 |

FOREIGN PATENT DOCUMENTS

| | | | |
|---|---|---|---|
| 0143681 | 11/1980 | Japan | 382/13 |
| 0157354 | 10/1985 | Japan | 382/13 |

OTHER PUBLICATIONS

*Vocabulary of Data Processing, Telecommunications and Office Systems*, Seventh Ed. IBM Co. 1981, pp. 26-27.
*Personal Computer Hardware Reference Library*, Rev. Edt., Jul. 1982, pp. 4-43 to 4-44.

*Basis*, IBM Co., Second Edt., May 1982, pp. 4-228 to 4-229 and 4-273 to 4-274.

Primary Examiner—Leo H. Boudreau
Assistant Examiner—Jose L. Couso
Attorney, Agent, or Firm—C. Lamont Whitham; Michael E. Whitham

[57] ABSTRACT

A computer based graphic editor has the capability of recognizing as a single graphic object a plurality of unconnected freehand strokes such as a signature. This makes possible editing a document with a signature, for example, without the various parts of the signature becoming separated and no longer being a viable entity. A cursor pointing device, such as a mouse with a button, is used to enter the plurality of unconnected strokes. Initially, the first point $p_1$ at the beginning of a stroke which is the first stroke of a plurality of unconnected strokes is read and stored with the visible attribute. As long as the button is pressed, the position of the cursor is monitored and lines drawn from each successive point to the next point $p_2$ with each point $p_2$ being stored with the visible attribute. When the mouse button is released, the last read point position $p_2$ is stored with the invisible attribute. When the mouse button is pressed again, the first point $p_1$ of the next stroke is read and stored with the visible attribute, and the process repeated. When the mouse button is again pressed and released, the ending position of the previous stroke $p_0$, the starting position of the current stroke $p_1$ and the ending position of the current stroke $p_2$ are compared and, if $p_1$ and $p_2$ are within a tolerance range and there exist no other points between $p_1$ and $p_2$ and if $p_1$ and $p_0$ are within the tolerance range, then the termination of the signature is detected.

4 Claims, 1 Drawing Sheet

FREEHAND DRAWING CONTAINING INVISIBLE LINES

DESCRIPTION

1. Field of the Invention

The present invention generally relates to graphic editors run on either a stand alone computer or a host connected work station and, more particularly, to a graphic editor for freehand drawing which will recognize as a single graphic object a plurality of unconnected strokes.

2. Description of the Prior Art

Graphic editors for stand alone computers and host connected work stations are known which are capable of manipulating primitive graphic objects such as lines, circles, rectangles and the like. More sophisticated graphic editors also accept as input freehand drawing. Typically, a drawing cursor is displayed on the computer or workstation display screen, and this drawing cursor is moved by the operator using a cursor positioning device such as a joy stick, mouse or digitizing tablet and stylus. In some cases a so-called "touch screen" may be used as an input to the graphic editor wherein the operator may use his finger to trace out the freehand drawing on the display screen. For any pointing device, the user interface should be the same as long as there is at least one button on the pointing device. Alternatively, any key on the keyboard can be used if a button is not available.

One application of freehand drawing in a graphic editor in a business environment is the signing of a signature. For example, in a mixed object editor which supports text objects as well as graphic objects in a common document, the operator may compose a letter or memorandum using the mixed object editor. Rather than printing this document, signing the original and making copies of the signed document for distribution, the operator may prefer to transmit the document electronically either within a network or via a nondedicated communication medium to the intended receipients. However, it is still desirable for the document, whether displayed or printed in hard copy, to bear the originator's signature as an indication of its authenticity. This can be done using the freehand drawing capabilities of some graphic editors, but there is a problem in the manipulation of the signature by the editor which sometimes produces strange results. Typically, a freehand graphic editor recognizes freehand drawing strokes as single graphic entities. Thus, the first name, middle initial and last name of the signature are each treated as separate entities. Moreover, some characters such as the letters i, j, f, t, and x are composed of more than one stroke, and each stroke is treated as a separate graphic entity. As a result, it is possible in editing or transmitting a mixed object document, the signature will become divided between lines or pages. The division may be between parts of the name or even in the middle of a part of the name if that part contains a character comprising more than one stroke. The resulting display or print out of the document will therefore not contain a viable signature serving to authenticate the origin of the document.

SUMMARY OF THE INENTION

It is therefore an object of the present invention to provide a technique for causing a graphic editor to treat as a single graphic object a freehand input which is composed of more than one stroke.

It is another object of the invention to provide a graphic editor, which is part of a mixed object editor, that will treat a signature entered as a freehand draw object as a single object.

According to the invention, an attribute is defined for a freehand drawing. This attribute is the invisible line connection attribute and is turned on between strokes while the operator is writing his signature. For example, if the input draw cursor positioning device is a mouse or a joy stick, a button or key is provided on the mouse or joy stick which is pressed once by the operator between strokes while writing his signature and pressed twice upon completion of writing his signature. Similar user interfaces can be provided for other draw cursor positioning devices such as digitizing tablets and "touch screens".

A freehand drawing is constructed by collecting a sequence of points on the display; i.e., $P_1$, $P_2$, $P_3$, ... For every adjacent point, a line segment is drawn between them. The distance between two points is dependent on how fast the pointing cursor position can be recorded during the pointing device movement. This distance should be small enough to show the smoothness of the drawing. For every point $P_i$, attributes such as line style, line width, and line color is defined. If the color attribute of a point is assigned to be the same as the background color of the display, then the line segment between this point to the next adjacent point will be invisible on the display. The last point of each stroke should always have this invisible line attribute.

Simulating the hand writing of the operator using a computer input device can be done in several different ways. In general, the operator needs to define both the starting position and the ending position of the writing. The starting position can be defined by detecting the position when the button on the pointing device is pressed. The ending position can be defined by detecting the position when the button on the pointing device is released. The "press-and-hold" user interface is very neutral since it is the same as normal drawing process; that is, press the pin on the paper and draw and lift the pen off the paper to stop. The button on the pointing device is pressed at the beginning of each stroke and held during the stroke, and it is then released at the end of the stroke.

During the freehand drawing, the user should be able to sign more than one signature without redefining the drawing mode. The system then needs to be able to distinguish the difference between two strokes and between two signatures. The difference is important if the whole signature needs to be treated as one single object during a subsequent editing process.

The termination of signature can be simply defined by pressing a previous defined key on the keyboard. This is not a very good user interface since the user has to move his finger from the pointing device to the keyboard. A better way of doing this is to use the button on the pointing device so the user can keep his finger on the pointing device all the time during the drawing. Introducing an extra click of the button at the end of the signature can achieve this purpose. The termination of a signature can be defined when both the following conditions are true:

I. The ending position of the previous stroke and the starting position of the current stroke are the same.

II. The current stroke contains only one point; i.e., a dot.

Condition I by itself is insufficient for determining the termination of a signature simply because it implies that the user may start to draw the current stroke from the ending position of the previous stroke. Condition II by itself is insufficient for determining the termination of a signature simply because it implies a single dot is just drawn. By combining both conditions I and II, the termination condition can be made unambiguous.

Requiring the user to click the pointing device button without moving the pointing device is not easy since a slight hand movement during the clicking of the button can produce a completely different result. The system should allow a tolerance range during the extra click so that if the distance between any of those three points, the ending position of the previous stroke, the starting position of the next stroke, and the ending position of the next stroke are all within a tolerance range, 5 mm for example, then it is considered that all three points are the same.

BRIEF DESCRIPTION OF THE DRAWINGS

The foregoing and other objects, aspects and advantages of the invention will be better understood from the following detailed description of a preferred embodiment of the invention with reference to the accompanying drawings, in which.

DETAILED DESCRIPTION OF THE PREFERRED EMBODIMENT OF THE INVENTION

Figures 1, 2:
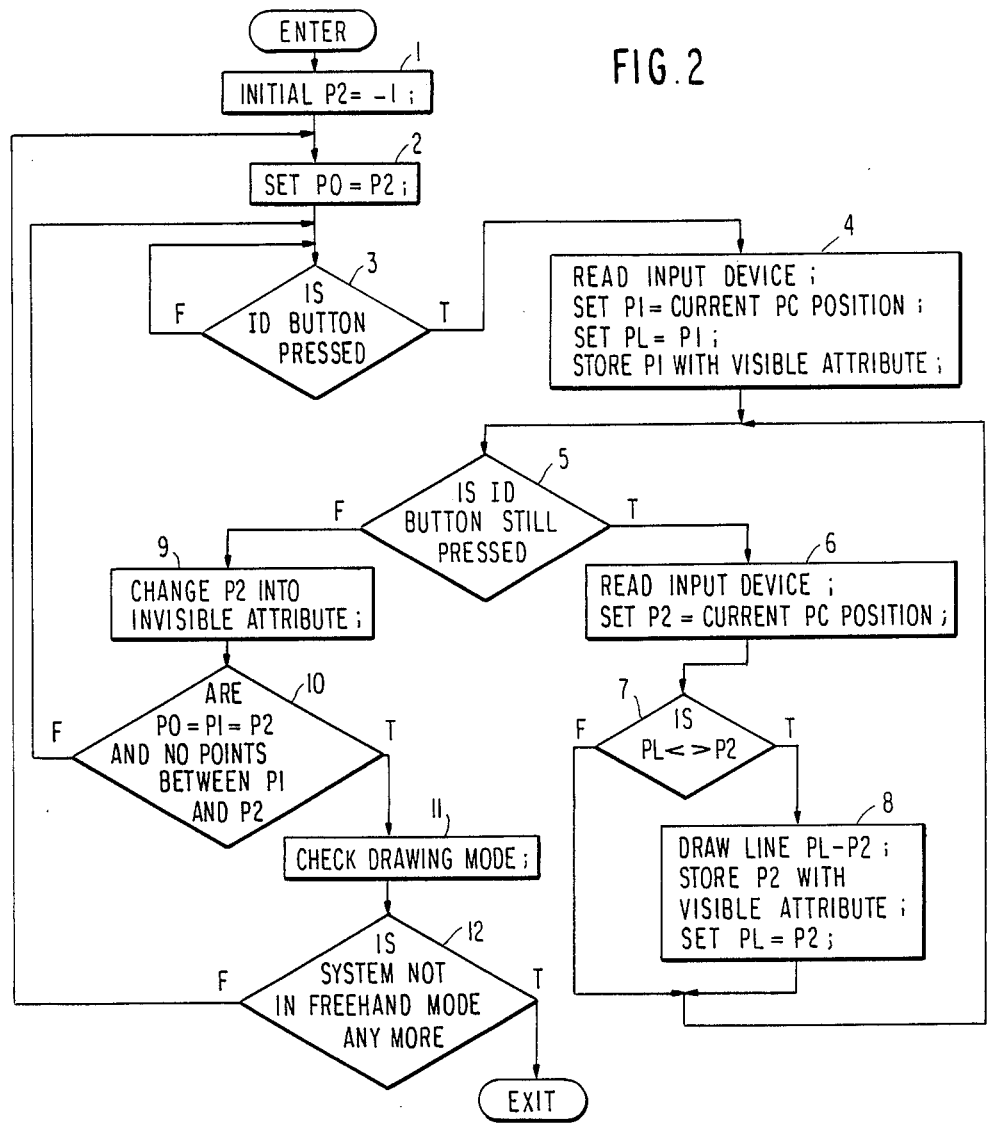
FIG. 1 is an illustration of a free hand drawing of a signature on a computer display showing in dotted line the invisible lines connecting the first name, middle initial and last name.
FIG. 2 is a flow chart of the process according to the present invention.

As mentioned, freehand drawing in a graphic editor can be used for creating a person's signature which contains a first name, a middle name or initial, if any, and a last name, all of which should be treated as one, single object during object manipulation such as move, copy, and delete. Characters such as i, j, f, t and x are constructed by two strokes which are not connected. In order to treat a signature which is constructed by more than one, unconnected stroke, the invisible line connection, which is the subject of this invention, is necessary. FIG. 1 shows a freehand drawing of a signature as it might be displayed on a computer or host display screen. Only the solid lines of the signature shown in FIG. 1 are actually displayed. The dotted lines represent the invisible line connection.

A clear user interface which distinguishes the ending of a stroke of a character or the ending of a first name from the ending of the complete signature is defined by an extra press of the mouse button in the preferred and illustrative embodiment of the invention. Every time the mouse button is pressed, the x,y points which the mouse traverses will be recorded into the graphic object data structure. Initially, the first point $p_1$ at the beginning of a stroke which is the first stroke of a plurality of unconnected strokes is read and stored with the visible attribute. As long as the mouse button is pressed, the position $P_L$ of the cursor is monitored and lines drawn from each successive point to the next point $P_2$ with each point $P_2$ being stored with the visible attribute. When the mouse button is released, the last read position point $P_2$ is stored with the invisible attribute. When the mouse button is pressed again, the first point of the next stroke is read and stored with the visible attribute, and the process is repeated. When the mouse button is again pressed and released, the ending position point $P_\emptyset$ of the previous stroke, the starting position point $P_1$ of the current stroke and the ending position point $P_2$ of the current stroke are compared and, if $P_1$ and $P_2$ are within the tolerance range and there exist no other points between $P_1$ and $P_2$ and if $P_1$ and $P_\emptyset$ are within the tolerance range, then the termination of a signature is detected.

FIG. 2 is a flow chart of the process according to the invention. $P_\emptyset$, $P_1$, $P_L$, and $P_2$ are defined as follows:

$P_\emptyset$: The ending position of the previous stroke.

$P_1$: The starting position of the current stroke.

$P_L$: The last position of the current stroke, a temporary position.

$P_2$: The ending position of the current stroke.

In block 1, $P_2$ is initially undefined (a negative number which does not exist on the display) $P_\emptyset$ is then assigned to the same value of $P_2$ in block 2. The control loops in block 3 until the input device button is pressed. In block 4, the current pointing cursor position is read and its value is assigned to $P_1$ and $P_L$. The first point $P_1$ is then stored into the object data structure with a visible attribute. The input device button status is then tested in block 5. If it is in the pressed state, the control goes to block 6 which reads the input device to detect the current pointing cursor position. The value is then assigned to $P_2$. $P_L$ and $P_2$ are tested in block 7. If $P_L$ does not equal $P_2$, then in block 8, a line is drawn on the display between $P_L$ and $P_2$. The next point $P_2$ is stored into the object data structure with a visible attribute, and the new $P_2$ is assigned to $P_L$. In either case of the outcome of the test in block 7, control goes back to test block 5 until the button released state is detected. After the button is detected to have been released, control goes to block 9. Since a button release indicates the end of the current stroke, $P_2$ is now the end point of the current stroke, and the invisible attribute is assigned to it. In block 1$\emptyset$, a determination is then made to see whether the signature termination condition occurs; that is, to see whether $P_\emptyset$, $P_1$ and $P_2$ are within the tolerance range and there exists on other points between $P_1$ and $P_2$. If signature termination has not yet occured, the control loops back to block 3 waiting for the drawing of the next stroke. If the signature termination condition occurs, control goes to block 11 which checks the current drawing mode to see if the user has changed to any other graphic object drawing state. Changing from one graphic object draw mode to another can be done by selecting a different drawing tool from a pop-down panel, for example, or simply by pressing a key on the keyboard. In block 12, if the system is still in freehand drawing mode, then control goes back to block 2 and waiting for the next signature drawing. Control exits if the system is no longer in freehand drawing mode.

The following code written in Program Design Language (PDL) implements the procedure just described. Source and object code can be easily derived from the PDL code.

---

INITIAL P2 (ENDING POSITION OF THE CURRENT STROKE) = −1
REPEAT

-continued

```
SET P0 (ENDING POSITION OF THE PREVIOUS
STROKE) = P2
REPEAT
  REPEAT
    UNTIL INPUT DEVICE BUTTON IS PRESSED
    READ INPUT DEVICE POSITION
    SET P1 (STARTING POSITION OF THE CURRENT
    STROKE) = CURRENT POINTING CURSOR
    POSITION
    STORE P1 WITH VISIBLE ATTRIBUTE
    WHILE INPUT DEVICE BUTTON IS STILL PRESSED DO
      READ INPUT DEVICE
      SET P2 = CURRENT POINTING CURSOR POSITION
      IF PL <> P2 THEN
        DRAW LINE BETWEEN PL AND P2
        STORE P2 WITH VISIBLE ATTRIBUTE
        SET PL = P1
      ENDIF
    ENDWHILE
    CHANGE P2 INTO INVISIBLE ATTRIBUTE
  UNTIL BOTH (P0 = P1 = P2) AND (THERE EXISTS NO
  OTHER POINTS BETWEEN P1 AND P2)
  CHECK DRAWING MODE
UNTIL SYSTEM NO LONGER IN FREEHAND DRAWING
MODE
```

According to the code $P_2$, the ending position of the current code is initialized to $-1$ which is off the screen. The process begins by settin $P_0$, the ending position of the previous stroke if any, equal to $P_2$. The input device button is monitored and, when the button is pressed, the position of the input device is read. At this point in the code, the begining of a stroke has occurred, and so the current position of the cursor is set to equal $P_1$. $P_1$ is stored with the visible attribute. Then while the input device button is still pressed, each successive point $P_2$ is read and stored with the visible attribute and lines drawn on the screen between the current cursor position and the next previous position. This process continues until the input button is no longer pressed at which time the attribute stored with the last point $P_2$ is changed to the invisible attribute. This whole process repeats until the last point $P_0$ of the previous stroke, the first point $P_1$ of the current stroke and the last point $P_2$ of the current stroke are equal and there exists no other points between $P_1$ and $P_2$. When this occurs, the drawing mode is checked, it being possible to write yet another signature for example as long as the drawing mode remains the freehand drawing mode. The process ends, however, when the system is no longer in freehand drawing mode.

While the invention has been described in terms of a preferred embodiment employing a mouse as a cursor pointing device and a button on the mouse as the user interface for indicating the begining and ending of strokes and the ending of a series of unconnected strokes which constitute a signature, for example, those skilled in the art will recognize that modifications and variations are possible in the practice of the invention without departing from the scope of the appended claims. In particular, it will be recognized that the invention is not limited to specific hardware cursor pointing devices and that the invention may be used for other and different graphic objects than signatures.

Having thus described my invention, what I claim as novel and desire to secure by Letters Patent is as follows:

1. In a computer based graphic editor, a method of recognizing as a single graphic object a plurality of unconnected freehand strokes comprising the steps of:
   detecting and storing with a visible attribute a first point at a beginning of a displayable stroke which is a first stroke of said plurality of unconnected strokes;
   storing each successive point of said first stroke with said visible at tribute;
   detecting a last point of said first stroke and storing said last point with an invisible attribute;
   repeating each of the preceding steps for each succeeding stroke of said plurality of unconnected strokes;
   each time a first point and a last point of a succeeding stroke are detected, comparing a last point of a previous stroke with first and last points of a current stroke and if said first and last points of the current stroke are within a predetermined tolerance range and there exist no other points between said first and last points of the current stroke and if the first point of the current stroke and the last point of the previous stroke are within said predetermined tolerance range, detecting an end of said plurality of unconnected strokes; and
   recognizing said plurality of unconnected strokes as a single graphic object in said graphic editor by storing said strokes connected by invisible lines connecting successive invisible and visible attributes, whereby in formatting a document, said graphic editor will display said single graphic object without fragmentation.

2. The method of recognizing as a single graphic object a plurality of unconnected strokes as recited in claim 1 wherein a cursor is displayed on a computer screen and an input device with a button is used to position said cursor, said steps of detecting a first point and detecting a last point being performed by monitoring when said button is pressed and released, respectively.

3. A method of writing a signature in a mixed object editor which supports text objects and graphic objects in a single document comprising the steps of:
   entering a plurality of unconnected strokes in a freehand graphics mode of said mixed object editor, said plurality of unconnected strokes constituting said signature;
   at the beginning of each of said unconnected stroke, storing a visible attribute indicating the beginning of a displayable stroke;
   at the end of each of said unconnected stroke, storing an invisible attribute indicating the end of a displayable stroke; and
   recognizing said plurality of unconnected strokes as a single graphic object in said mixed object editor by storing said strokes connected by invisible lines connecting successive invisible and visible attributes, whereby in formatting a document, said mixed object editor will display said signature as a single freehand graphic object without fragmentation.

4. The method recited in claim 3 wherein said plurality of unconnected strokes are drawn on a computer screen by a cursor controlled by an input device with a button, said step of entering comprising the steps of:
   pressing said button at the beginning of each stroke to input said visible attribute and moving said input device to enter each said stroke;
   releasing said button at the end of each stroke to input said invisible attribute and moving said input device to a beginning of a succeeding stroke; and
   pressing and releasing said button at an end of a last stroke of said plurality of unconnected strokes without moving said input device.

* * * * *